(12) United States Patent
Hsiao

(10) Patent No.: US 11,801,453 B2
(45) Date of Patent: Oct. 31, 2023

(54) ATMOSPHERIC PRESSURE WATER ION PLANT CELL DISRUPTION AND EXTRACTION METHOD AND APPARATUS

(71) Applicant: YAU FU INDUSTRY CO., LTD., New Taipei (TW)

(72) Inventor: Ruei-Chang Hsiao, New Taipei (TW)

(73) Assignee: YAU FU INDUSTRY CO., LTD., New Taipei (TW)

( * ) Notice: Subject to any disclaimer, the term of this patent is extended or adjusted under 35 U.S.C. 154(b) by 401 days.

(21) Appl. No.: 17/116,249

(22) Filed: Dec. 9, 2020

(65) Prior Publication Data
US 2022/0176271 A1 Jun. 9, 2022

(51) Int. Cl.
| | | |
|---|---|---|
| C11B 1/10 | (2006.01) |
| C02F 1/46 | (2023.01) |
| B01D 11/02 | (2006.01) |
| F26B 3/34 | (2006.01) |
| C02F 1/461 | (2023.01) |
| C11B 1/16 | (2006.01) |
| F22G 1/16 | (2006.01) |
| F22B 29/06 | (2006.01) |
| F26B 3/06 | (2006.01) |
| B01D 11/00 | (2006.01) |

(52) U.S. Cl.
CPC ........ *B01D 11/0219* (2013.01); *C02F 1/4618* (2013.01); *C11B 1/10* (2013.01); *C11B 1/104* (2013.01); *C11B 1/16* (2013.01); *F22B 29/06* (2013.01); *F22G 1/165* (2013.01); *F26B 3/06* (2013.01); *F26B 3/34* (2013.01); *B01D 2011/007* (2013.01)

(58) Field of Classification Search
CPC .. C11B 1/10; C11B 1/104; C11B 1/16; B01D 11/0219; B01D 2011/007; C10B 49/02; C01F 1/4618; F22G 1/165; F22B 29/06; F26B 3/34
See application file for complete search history.

(56) References Cited

U.S. PATENT DOCUMENTS

| | | | | |
|---|---|---|---|---|
| 3,218,172 A | * | 11/1965 | Hess | ............... A23K 30/12 426/429 |
| 6,479,277 B2 | | 11/2002 | Duncan | |
| 2006/0142555 A1 | * | 6/2006 | Jonnala | ............... C07H 15/24 536/18.1 |

FOREIGN PATENT DOCUMENTS

| | | | | |
|---|---|---|---|---|
| TW | M288511 U | 3/2006 | | |
| TW | I411677 B | 10/2013 | | |
| TW | 1766432 B | * | 6/2022 | ............ C12N 5/04 |

\* cited by examiner

*Primary Examiner* — Yate' K Cutliff

(57) ABSTRACT

A method for cell disruption and extraction of a plant, includes placing plant material on a porous container, placing the porous container into a reaction device, and producing water ion steam of an atmospheric pressure by a water ion generator. The water ion steam infiltrates the porous container and permeates the plant material. The water ion steam penetrate cells of the plant material and breaks the cell wall of the cells, to cause a cell disruption. The residual water ion steam is drained outward from the exhaust pipe of the box.

10 Claims, 3 Drawing Sheets

ATMOSPHERIC PRESSURE WATER ION PLANT CELL DISRUPTION AND EXTRACTION METHOD AND APPARATUS

BACKGROUND OF THE INVENTION

1. Field of the Invention

The present invention relates to a method and an apparatus for cell disruption and extraction of biological material and, more particularly, to a method and an apparatus for cell disruption and extraction of a plant by using atmospheric pressure water ions.

2. Description of the Related Art

In recent years, plant extraction becomes a very popular technology. For example, medicinal material is used to obtain pure ingredients, algae is made into biodiesel, and tea leaves is used to obtain polyphenol. In general, it is necessary to perform a cell disruption process before the plant extraction so as to increase the extraction rate. In the process of the cell disruption, it is necessary to chop the plant to a determined extent and then to put it into the liquid so as to perform the cell disruption. Therefore, it is necessary to consider if the composition of the liquid will have a chemical reaction with the components to be extracted in the plant cell. Besides, it is also necessary to consider recovery of the liquid.

The U.S. Pat. No. 6,479,277 disclosed a Method and an apparatus for disruption of biological material. The high-pressure $CO_2$ is used to infiltrate the dried cells. Then, the pressure is dropped instantaneously, so that the $CO_2$ cannot be completely extruded from the cells. Thus, the $CO_2$ is expanded in the cells, so that the cells are broken. The disadvantage is in that, the drying treatment has a high energy consumption. In addition, the cells have high permeability to $CO_2$ and $O_2$. Thus, it is necessary to maintain a high-speed depressurization in order to reduce the discharge of $CO_2$ from the pores of the cells during depressurization, so as to keep the cell disruption effect.

The Taiwanese Patent Publication No. M288511 disclosed a high-pressure breaking device for the cell wall of green algae. The high-temperature steam is used to make the water molecules in the cells reach the critical point of vaporization. Then, the pressure is dropped instantaneously, so that the water molecules in the cells are vaporized to break the cell wall. The disadvantage is in that, the high-temperature process consumes a high energy. In addition, the high temperature easily destroys and decomposes the active ingredients contained in the cells.

The Taiwanese Patent Publication No. 1411677 disclosed a continuous extraction and dehydration device for cell disruption of microalgae. A dehydration mechanism is used to remove water from the microalgae. Then, supercritical $CO_2$ is used to make the pressure reach the critical point. Then, the pressure is dropped instantaneously, so that the cells of the microalgae are broken. The disadvantage is in that, the raw material need to be dried and dehydrated previously. In addition, the cell disruption process consumes a high energy.

BRIEF SUMMARY OF THE INVENTION

In accordance with the present invention, there is provided a method for cell disruption and extraction of a plant, comprising placing plant material on a porous container, placing the porous container into a reaction device, producing water ion steam of an atmospheric pressure by a water ion generator, the water ion steam infiltrating the porous container and permeating the plant material, and the water ion steam penetrating cells of the plant material and breaking a cell wall of the cells, to cause a cell disruption.

In accordance with the present invention, there is also provided an apparatus for cell disruption and extraction of a plant, comprising a reaction device. The reaction device includes a box, a water ion steam module, and a porous container. The box has a side provided with a door. The box has an interior provided with a plurality of support racks. The box has a top provided with an exhaust pipe connected to the interior of the box. The water ion steam module includes a steam generator, a supercharger, and a water ion generator. The steam generator producing saturated steam. The supercharger is connected with the steam generator. The supercharger receives and heats the saturated steam into a superheated steam. The water ion generator is connected with the supercharger. The water ion generator receives, dissociates, and transforms the superheated steam into water ions or water ion steam. The porous container is placed on the support racks and receives plant material. The water ion steam passes through the porous container and permeates the plant material. The water ion steam penetrates cells of the plant material and breaks the cell wall of the cells, to cause a cell disruption. The residual water ion steam is drained outward from the exhaust pipe of the box. The water ion steam penetrates the cell wall of the plant material to perform the cell disruption process under an atmospheric pressure state.

According to the primary advantage of the present invention, the apparatus for cell disruption and extraction of a plant has a simplified construction to save the cost of fabrication.

According to another advantage of the present invention, the apparatus for cell disruption and extraction of a plant is operated under an atmospheric pressure.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
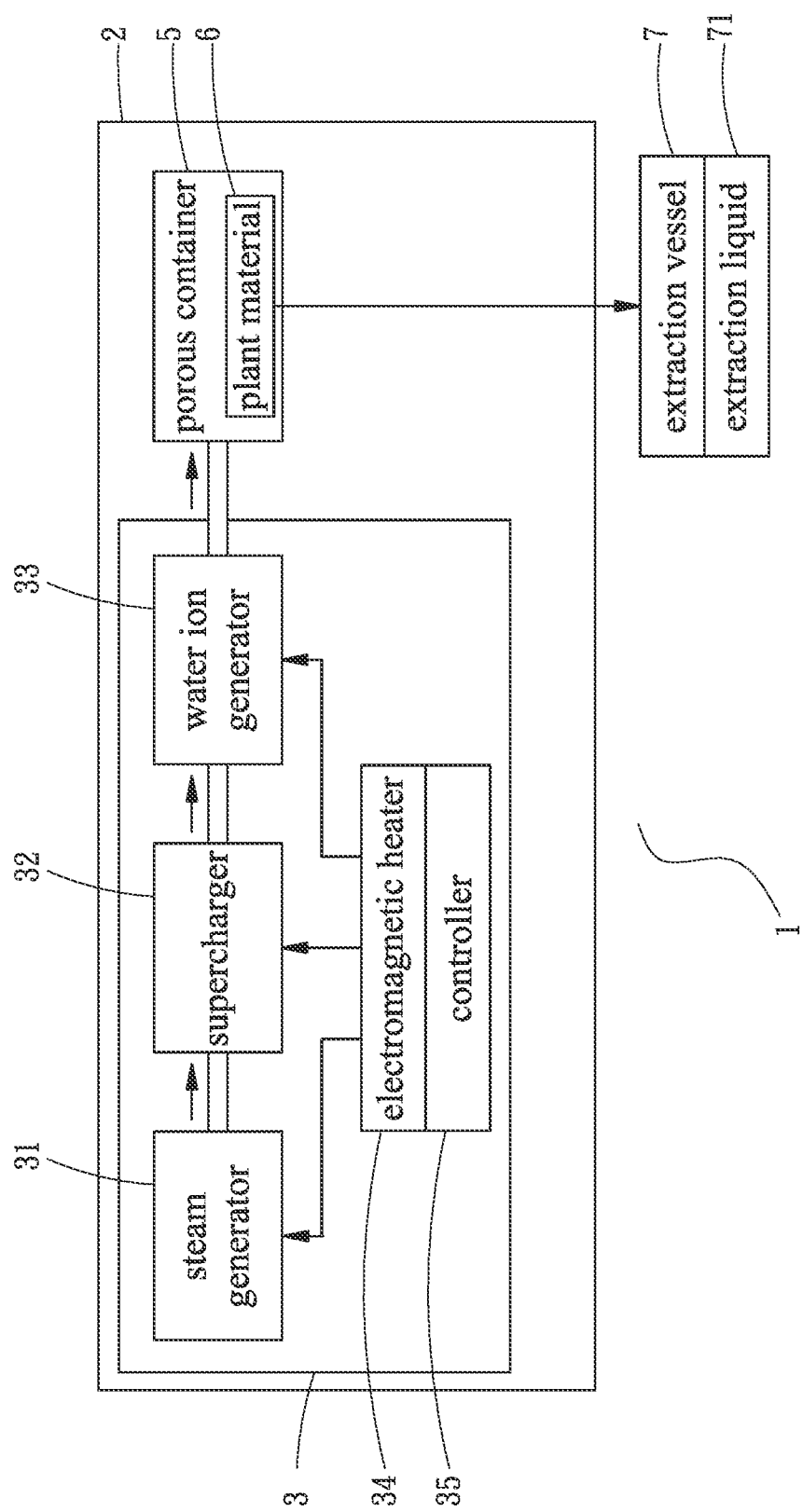
FIG. 1 is a block diagram of an apparatus for cell disruption and extraction of a plant in accordance with the preferred embodiment of the present invention.
Figure 2:
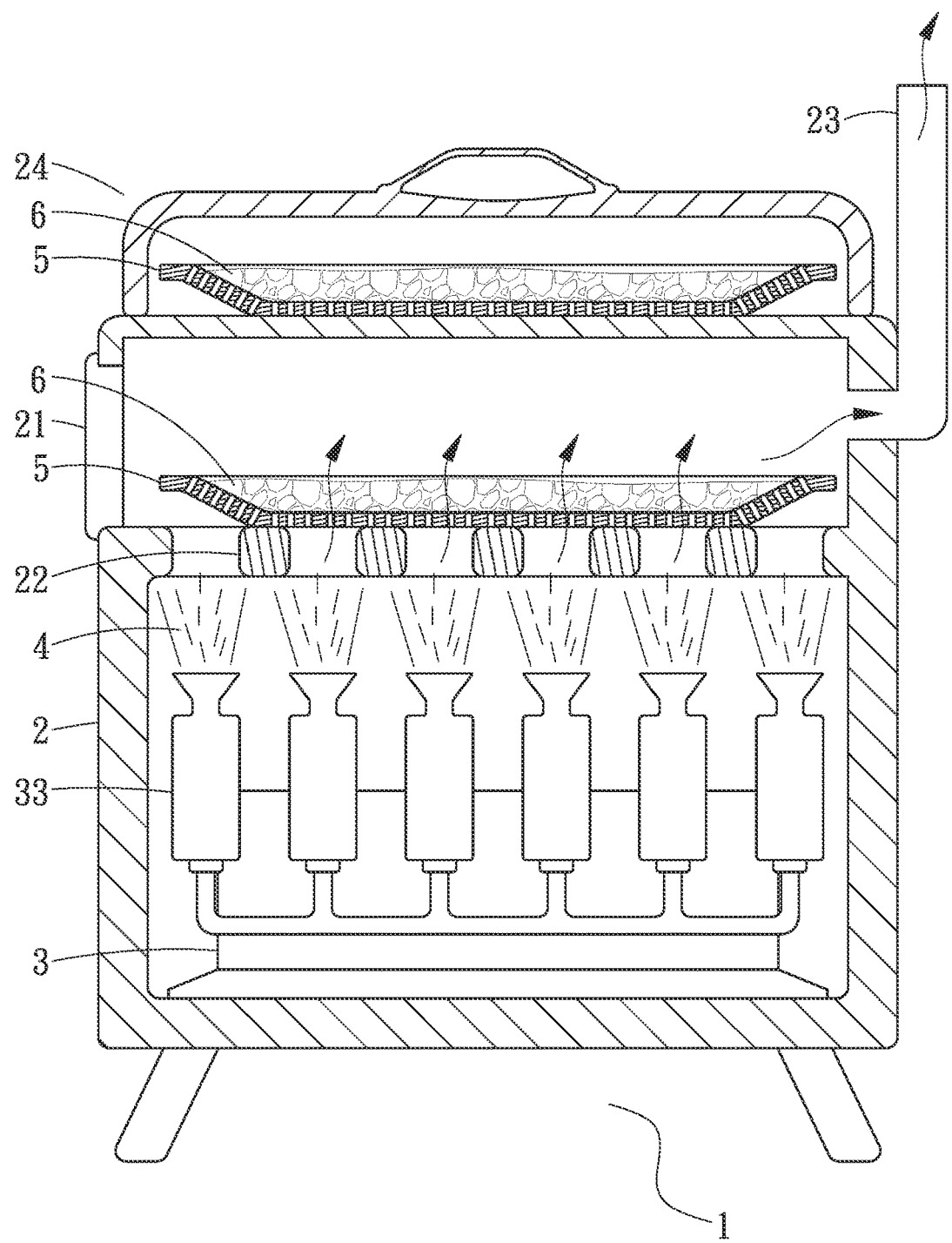
FIG. 2 is a cross-sectional of the apparatus for cell disruption and extraction of a plant in accordance with the preferred embodiment of the present invention.

Referring to the drawings and initially to FIGS. 1 and 2, an apparatus for cell disruption and extraction of a plant in accordance with the preferred embodiment of the present invention comprises a reaction device 1 and an extraction vessel 7.

The reaction device 1 includes a box 2, a water ion steam module 3, and a porous container 5.

The box 2 has a side provided with a door 21. The box 2 has an interior provided with a plurality of support racks 22. The box 2 has a top provided with an exhaust pipe 23 connected to the interior of the box 2. A movable shell 24 is pivotally mounted on the top of the box 2.

The water ion steam module 3 includes a steam generator 31, a supercharger 32, a water ion generator 33, an electromagnetic heater 34, and a controller 35. The steam generator 31 heats water to a temperature of at least 130° C. to 160° C. to produce saturated steam (or vapor). The supercharger 32 is connected with the steam generator 31. The supercharger 32 receives and heats the saturated steam of the steam generator 31 into a superheated steam. The water ion generator 33 is connected with the supercharger 32. The water ion generator 33 receives, dissociates, and transforms the superheated steam ($H_2O$) of the supercharger 32 into water ions or water ion steam 4. The water ions includes hydrogen ion ($H^+$) and hydroxyl ion or hydroxide ion ($OH^-$).

The electromagnetic heater 34 is electrically connected with the steam generator 31, the supercharger 32, and the water ion generator 33. The electromagnetic heater 34 supplies a heat energy to the steam generator 31, so as to heat the water into the saturated steam. The electromagnetic heater 34 supplies a heat energy to the supercharger 32, so as to heat the saturated steam into the superheated steam. The electromagnetic heater 34 supplies a heat energy to the water ion generator 33, so as to dissociate the superheated steam into the water ion steam 4.

The controller 35 is electrically connected with the electromagnetic heater 34. The controller 35 controls and regulates the operation parameters of the electromagnetic heater 34 corresponding to the steam generator 31, the supercharger 32, and the water ion generator 33, so as to control operation of the steam generator 31, the supercharger 32, and the water ion generator 33. For example, the controller 35 presets the heating time, the heat temperature, and the flow rate of the saturated steam of the steam generator 31. The controller 35 also presets the pressure of the supercharger 32. The controller 35 also presets the flow rate of the water ion steam 4 of the water ion generator 33. It is noted that, the controller 35 includes a computer, a terminal, a server, a human/machine interface or an embedded system. In addition, the electromagnetic heater 34 include coils which produce a magnetic field, with many eddy currents being formed between the magnetic field and the metallic pipes or containers, such that the metallic pipes or containers produce the heat energy. The electromagnetic heater 34 is a traditional technology and will not be further described in detail.

The porous container 5 is placed on the support racks 22 and receives plant material 6. The extraction vessel 7 contains extraction liquid 71.

In operation, the water ion steam 4 passes through the porous container 5 and permeates the plant material 6. In such a manner, the water ion steam 4 penetrates cells of the plant material 6 and breaks the cell wall of the cells, to cause a cell disruption. Then, the residual water ion steam 4 is drained outward from the exhaust pipe 23 of the box 2. Thus, the water ion steam 4 has higher humidity and higher temperature under the atmospheric pressure state so that the cell wall of the plant material 6 is expanded extremely, and the water ion steam 4 penetrates the cell wall of the plant material 6 so as to accelerate the cell disruption process.

The plant material 6 is placed into the extraction vessel 7 and mixed with the extraction liquid 71 after the cell disruption process of the reaction device 1. The extraction liquid 71 extracts the compound from the plant material 6 to achieve the extraction purpose.

Figure 3:
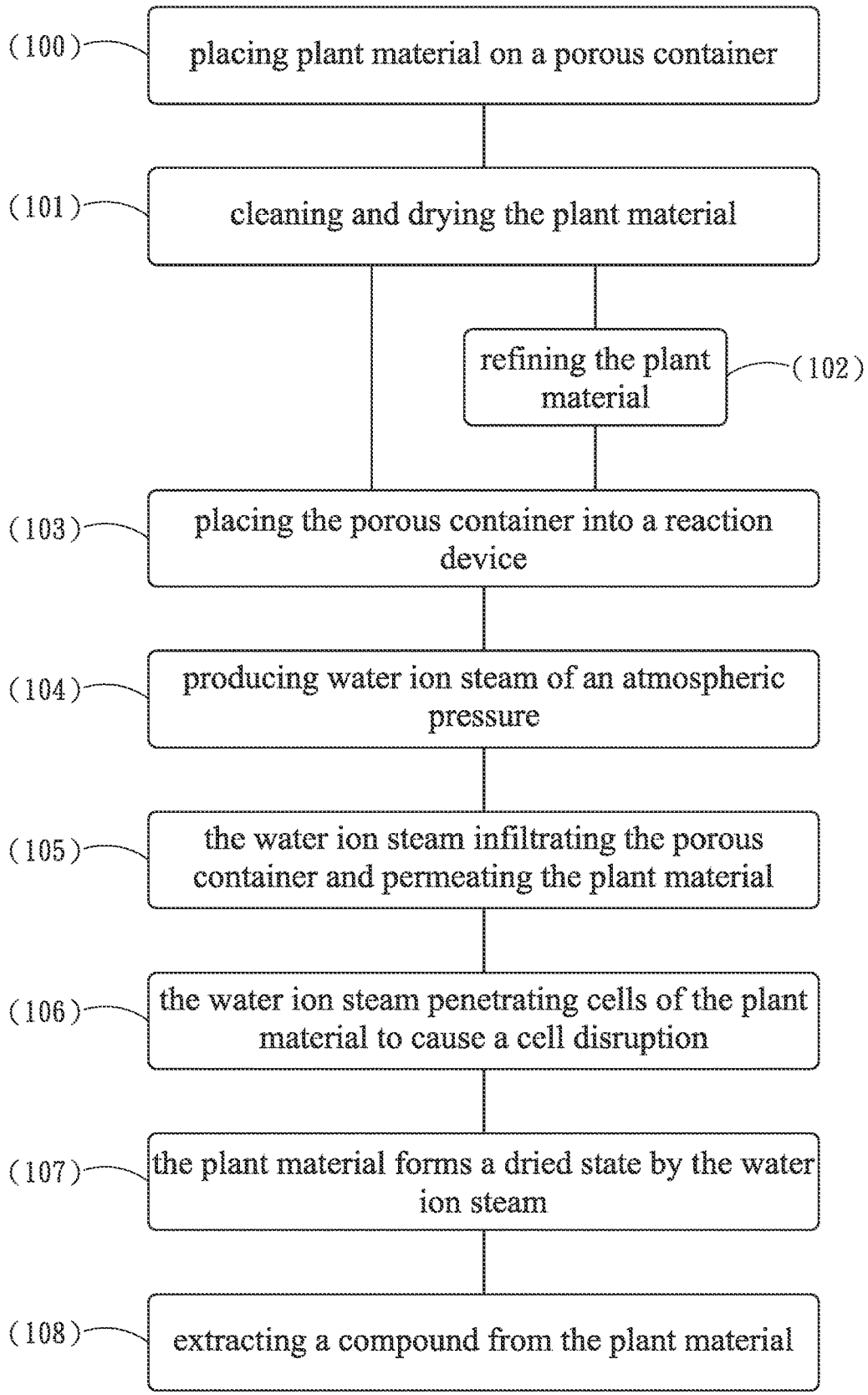
FIG. 3 is a flow chart of a method for cell disruption and extraction of a plant in accordance with the preferred embodiment of the present invention.

Referring to FIG. 3 with reference to FIGS. 1 and 2, a method for cell disruption and extraction of a plant in accordance with the preferred embodiment of the present invention comprises a step 100 of placing plant material 6 on a porous container 5, a step 103 of placing the porous container 5 into a reaction device 1, a step 104 of producing water ion steam 4 of an atmospheric pressure by a water ion generator 33, a step 105 of the water ion steam 4 infiltrating the porous container 5 and permeating the plant material 6, and a step 106 of the water ion steam 4 penetrating cells of the plant material 6 and breaking a cell wall of the cells, to cause a cell disruption.

The step 100 of placing plant material 6 on a porous container 5 further includes a step 101 of cleaning and drying the plant material 6. In the step 101 of cleaning and drying the plant material 6, the plant material 6 is cleaned and then dried before being placed on the porous container 5. The step 101 of cleaning and drying the plant material 6 includes cleaning and drying the plant material 6 until a surface of the plant material 6 is dried or until the plant material 6 is fully dehydrated. Thus, the plant material 6 is dried to reduce water contained in the cells of the plant material 6.

The step 101 of cleaning and drying the plant material 6 further includes a step 102 of refining (or processing) the plant material 6. The step 102 of refining the plant material 6 includes slicing, dicing, cutting or mashing the plant material 6 so as to refine the plant material 6.

In practice, if the plant material 6 only contains flowers or leaves, the plant material 6 is directly placed on the porous container 5 after being cleaned and dried. If the plant material 6 contains roots or stems, the plant material 6 has to be refined before being placed on the porous container 5. It is appreciated that, the plant material 6 keeps a determined solid shape without having to be pulverized into powder.

In the step 104 of producing water ion steam 4 of an atmospheric pressure by a water ion generator 33, the steam generator 31 heats the water to at least 130° C. to 160° C. to produce a saturated steam, the supercharger 32 receives and heats the saturated steam into a superheated steam, and the water ion generator 33 receives, dissociates, and transforms the superheated steam ($H_2O$) of the supercharger 32 into water ions or water ion steam 4. The water ions includes hydrogen ion ($H^+$) and hydroxyl ion or hydroxide ion ($OH^-$).

The step 106 of the water ion steam 4 penetrating cells of the plant material 6 and breaking a cell wall of the cells further includes a step 107 of the water ion steam 4 sucking water in the cells of the plant material 6 so that the plant material 6 forms a dried state. The step 107 of the water ion steam 4 sucking water in the cells of the plant material further includes a step 108 of extracting a compound from the plant material 6 by an extraction liquid 71. In the step 106 of the water ion steam 4 penetrating cells of the plant material 6 and breaking a cell wall of the cells, the water ion steam 4 passes through the porous container 5 and permeates the plant material 6. After the water ion steam 4 touches cells of the plant material 6, the water ion steam 4 largely penetrates the cells of the plant material 6 and breaks the cell wall of the cells, to cause a cell disruption. Then, the residual water ion steam 4 is drained outward from the exhaust pipe 23 of the box 2. In the step 107 of the water ion steam 4 sucking water in the cells of the plant material, after the water ion steam 4 permeates the plant material 6 and penetrates the cells of the plant material 6, the water ion steam 4 sucks water in the cells of the plant material 6 so that the plant material 6 is dehydrated and forms a fully dried state. Thus, the components in the cells of the plant material 6 are kept completely after the plant material 6 is fully dried. In the step 108 of extracting a compound from the plant material 6, the plant material 6 is placed into the extraction vessel 7 and mixed with the extraction liquid 71. The extraction liquid 71 extracts the compound from the plant material 6 to achieve the extraction purpose.

It is to be noted that, the surface of the plant material 6 needs to be dried after the plant material 6 is cleaned. A pre-drying space is defined between the box 2 and the shell 24. After the plant material 6 is placed on the porous container 5, the porous container 5 is placed into the pre-drying space, so that the plant material 6 is dried in advance, to clear the remnant water remaining on the surface the plant material 6.

Accordingly, the apparatus for cell disruption and extraction of a plant has a simplified construction to save the cost of fabrication. In addition, the apparatus for cell disruption and extraction of a plant is operated under an atmospheric pressure. Further, the water ion steam 4 extremely expands the cell wall of the plant material 6 by using humidity and temperature, so that the water ion steam 4 penetrates the cell wall of the plant material 6 and performs the cell disruption process quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for cell disruption and extraction of a plant, comprising:
    placing plant material on a porous container;
    placing the porous container into a reaction device;
    producing water ion steam of an atmospheric pressure by a water ion generator;
    the water ion steam infiltrating the porous container and permeating the plant material; and
    the water ion steam penetrating cells of the plant material and breaking a cell wall of the cells, to cause a cell disruption.

2. The method as claimed in claim 1, wherein the step of placing plant material on a porous container further includes a step of cleaning and drying the plant material.

3. The method as claimed in claim 2, wherein the step of cleaning and drying the plant material includes cleaning and drying the plant material until a surface of the plant material is dried or until the plant material is fully dehydrated.

4. The method as claimed in claim 2, wherein the step of cleaning and drying the plant material further includes a step of refining the plant material.

5. The method as claimed in claim 1, wherein the step of the water ion steam penetrating cells of the plant material and breaking a cell wall of the cells further includes a step of the water ion steam sucking water in the cells of the plant material so that the plant material forms a dried state.

6. The method as claimed in claim 5, wherein the step of the water ion steam sucking water in the cells of the plant material further includes a step of extracting a compound from the plant material by an extraction liquid.

7. An apparatus for cell disruption and extraction of a plant, comprising:
    a reaction device;
    wherein:
    the reaction device includes a box, a water ion steam module, and a porous container;
    the box has a side provided with a door;
    the box has an interior provided with a plurality of support racks;
    the box has a top provided with an exhaust pipe connected to the interior of the box;
    the water ion steam module includes a steam generator, a supercharger, and a water ion generator;
    the steam generator producing saturated steam;
    the supercharger is connected with the steam generator;
    the supercharger receives and heats the saturated steam into a superheated steam;
    the water ion generator is connected with the supercharger;
    the water ion generator receives, dissociates, and transforms the superheated steam into water ions or water ion steam;
    the porous container is placed on the support racks and receives plant material;
    the water ion steam passes through the porous container and permeates the plant material;
    the water ion steam penetrates cells of the plant material and breaks the cell wall of the cells, to cause a cell disruption;
    the residual water ion steam is drained outward from the exhaust pipe of the box; and
    the water ion steam penetrates the cell wall of the plant material to perform the cell disruption process under an atmospheric pressure state.

8. The apparatus as claimed in claim 7, wherein:
    the water ion steam module further includes an electromagnetic heater, and a controller;
    the electromagnetic heater is electrically connected with the steam generator, the supercharger, and the water ion generator;
    the controller is electrically connected with the electromagnetic heater;
    the controller controls operation parameters of the electromagnetic heater corresponding to the steam generator, the supercharger, and the water ion generator.

9. The apparatus as claimed in claim 7, wherein:
    a movable shell is pivotally mounted on the top of the box;
    a pre-drying space is defined between the box and the shell; and
    the plant material is placed on the porous container, and the porous container is placed into the pre-drying space, so that the plant material is dried in advance, to clear water remaining on a surface the plant material.

10. The apparatus as claimed in claim 7, wherein the water ion steam sucks water in the cells of the plant material so that the plant material forms a dried state.

* * * * *